United States Patent [19]

Peronnet et al.

[11] 4,273,603
[45] Jun. 16, 1981

[54] PROCESS FOR TRANSFER OF A MAGNETIC LAYER FROM A TEMPORARY TO A PERMANENT SUPPORT

[75] Inventors: Roland Peronnet, Limeil Brevannes; Bernard Couturier, Varennes Jarcy; Christian Fombert, Champigny, all of France

[73] Assignee: La Societe Pyral, Creteil, France

[21] Appl. No.: 950,032

[22] Filed: Oct. 10, 1978

[30] Foreign Application Priority Data

Oct. 21, 1977 [FR] France .................................. 77 31700

[51] Int. Cl.³ .................... B32B 31/20; B32B 31/08
[52] U.S. Cl. ................................. 156/236; 156/238;
    156/259; 156/324.4; 427/130; 427/131;
    427/149
[58] Field of Search .............. 156/236, 238, 192, 231,
    156/259, 270, 271, 246, 324, 324.4, 309.3, 327,
    330, 331, 332, 333; 427/130, 131, 149

[56] References Cited

U.S. PATENT DOCUMENTS

| | | | |
|---|---|---|---|
| 2,628,929 | 2/1953 | Persoon et al. ...................... | 156/238 |
| 2,700,629 | 1/1955 | Townsend .......................... | 156/236 |
| 2,909,442 | 10/1959 | Persoon et al. ...................... | 428/347 |
| 3,497,411 | 2/1970 | Chebiniak .......................... | 156/234 |
| 3,813,267 | 5/1974 | Honjo et al. ........................ | 156/236 |

FOREIGN PATENT DOCUMENTS

| | | | |
|---|---|---|---|
| 523397 | 4/1956 | Canada ............................. | 156/236 |
| 1250712 | 12/1960 | France . | |
| 1418611 | 10/1965 | France . | |
| 651645 | 4/1951 | United Kingdom . | |
| 829008 | 2/1960 | United Kingdom . | |

*Primary Examiner*—William A. Powell
*Assistant Examiner*—Thomas Bokan
*Attorney, Agent, or Firm*—Sherman & Shalloway

[57] ABSTRACT

A magnetic coating layer of magnetic particles dispersed in a resin binder on a temporary support is transferred to a permanent support by wetting the magnetic layer with an organic liquid which is a solvent for the binder and then bringing the wetted magnetic layer into contact with the permanent support and applying pressure at the line of contact. The magnetic layer is transferred to the permanent support without the necessity of a separate adhesive layer and without requiring application of heat.

12 Claims, 1 Drawing Figure

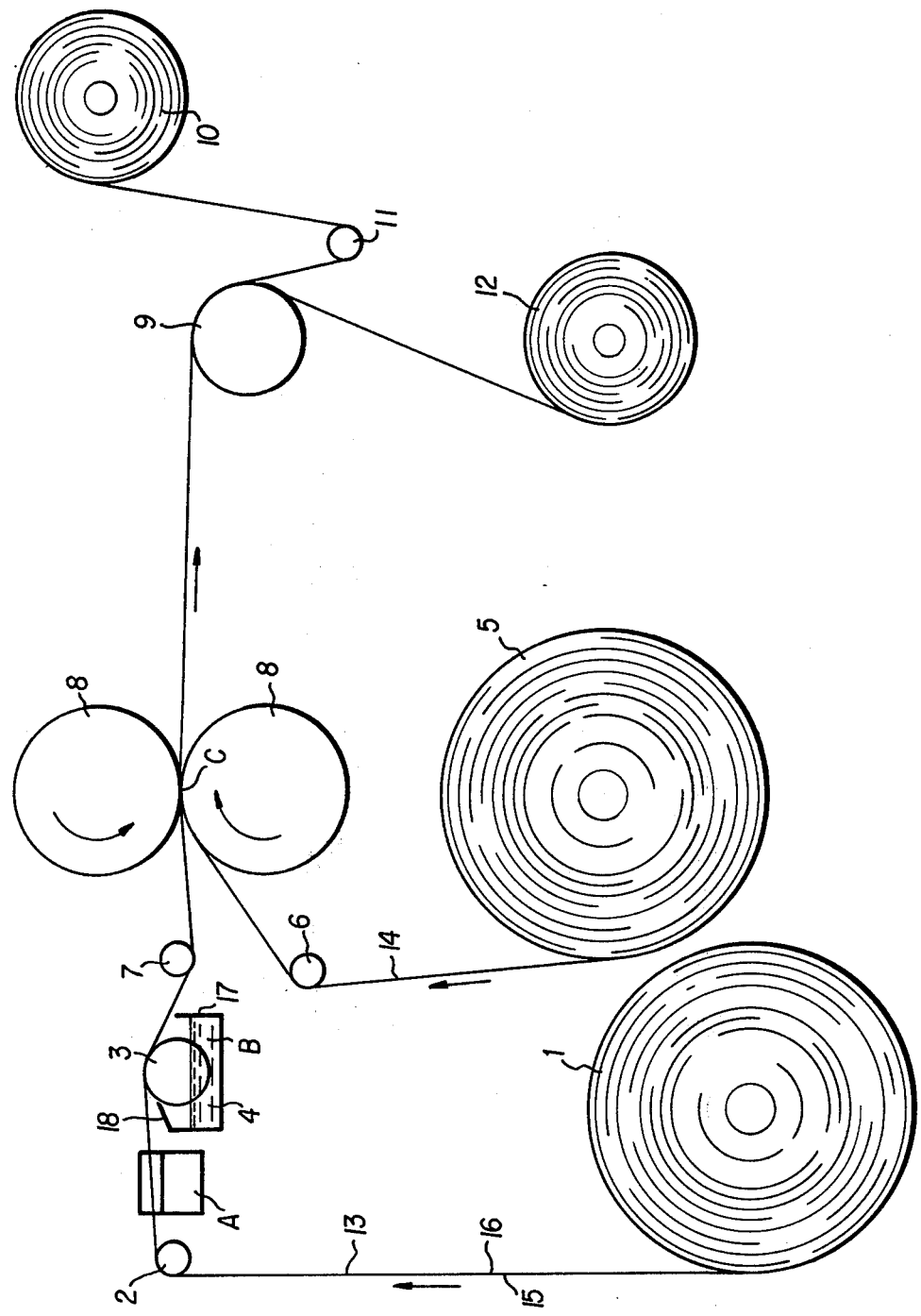

PROCESS FOR TRANSFER OF A MAGNETIC LAYER FROM A TEMPORARY TO A PERMANENT SUPPORT

BACKGROUND OF THE INVENTION

1. Field of Invention

This invention relates to a process for transferring a magnetic layer or a magnetic strip onto a permanent support.

2. Discussion of the Prior Art

The use of magnetic layers or magnetic strips for storing and recording information and other data has become widespread on a large variety of documents. Particular examples of this type of document include transportation tickets, highway toll tickets, credit cards, accounting cards, magnetic labels, etc. Magnetic strips (tracks) are also commonly used for providing the sound track on sound movie film.

Conventionally, the magnetic strip was permanently deposited on a substrate by a printing method using an ink containing a magnetic pigment. This technique proved to be unsuitable for obtaining a magnetic strip with good mechanical qualities such as flatness. The printing technique did not allow for obtaining magnetic recording of sufficient density to prevent the loss of information. Additionally, the printed magnetic strips were rough and caused premature wear of the reading heads.

One proposal to overcome these drawbacks was to directly fix a magnetic strip on the back of the support, for example, credit cards or similar tickets. In actual use, however, this process has the drawback of being expensive. In addition, the relatively large thickness of the magnetic strip prevented easy storage by superposition of a plurality of the cards or tickets. It therefore became necessary to provide a special housing to store the tickets and accordingly, increase the costs.

It has also been proposed, for example, in French Patent No. 1,250,712 and in U.S. Pat. Nos. 2,628,929, 2,909,442 and 3,497,411 to first form an intermediate magnetic strip on a temporary support and to transfer the magnetic strip to the permanent support while the magnetic coating is hot and under pressure. These processes have not, however, been entirely satisfactory since the application of heat tends to cause deformation of the permanent support or the magnetic strip resulting in irregularities of the magnetic properties of the transferred strip whose magnetic qualities are altered by the transfer. When the amount of heat transmitted to the magnetic strip is limited to avoid the occurrence of deformations, the rate of transfer becomes limited.

Also, the indirect transfer method of these patents generally requires the use of a separate adhesive layer to adhere the magnetic strip to the permanent support. This causes the thickness of the strip to be increased and also creates the possibility of additional irregularities in the qualities of the transferred magnetic strip.

SUMMARY OF THE INVENTION

It is therefore an object of the present invention to provide a process for forming magnetic layers or strips on various types of supports which have good mechanical and magnetic qualities.

It is another object of the present invention to provide a process for forming magnetic layers or strips with a high degree of smoothness and thinness while permitting the recording and storage of information with high density.

It is a further object of the present invention to provide an indirect transfer method of coating magnetic layers or magnetic strips on a permanent support which is both simple and economical and which does not require the application of heat or a separate adhesive layer.

It is still a further object of the present invention to provide an indirect transfer process for coating magnetic layers or magnetic strips on a permanent support which permits a high rate of transfer.

Another object of the present invention is to provide a process for transferring a magnetic layer or magnetic strip from a temporary support to a permanent substrate wherein the qualities of the magnetic layer are not adversely affected during the transfer process.

A still further object of the present invention is to provide cards, tickets, or other documents having a permanent magnetic layer or strip adhered thereto for recording information and which is capable of being passed through a read-out machine many hundred times or more without loss of information and without impairment of the mechanical and magnetic qualities of the magnetic layer or strip.

These and other objects of the present invention will become more apparent from the following detailed description and drawings in which:

The FIGURE is a schematic illustration of one embodiment of the apparatus for transfer of a magnetic layer according to the present invention.

Briefly, the method of transferring a magnetic layer or strip from a temporary support to a permanent substrate according to the present invention includes the steps of first applying a magnetic layer or strip of finely divided magnetic particles uniformly dispersed throughout a resin binder onto a temporary support, wetting the magnetic layer with an organic liquid which is a solvent for the resin binder and bringing the wetted magnetic layer into contact with a permanent substrate and applying pressure at the line of contact to transfer the magnetic layer from the temporary support to the permanent substrate.

The process of the present invention makes it possible to obtain transferred magnetic layers which are free from mechanical defects, are capable of recording data at high densities, and which have good resistance to wear caused by the frictional forces exerted by magnetic reading heads. The process of the present invention is easy to perform.

DETAILED DESCRIPTION OF THE INVENTION AND PREFERRED EMBODIMENTS

The magnetic layer of the present invention, which may be in the form of entire surface layers, strips, or tracks of any desired geometrical shape, is formed from finely divided magnetic particles uniformly dispersed in a resin binder. Essentially, all known ferro-magnetic or ferrimagnetic particles such as iron oxides, e.g., $\gamma$-$Fe_2O_3$, $\gamma$-$Fe_3O_4$, which may optionally be doped with cobalt, chromium dioxide ($CrO_2$), ferromagnetic alloys such as Fe.Co, Fe.Ni, Fe.Ni.Zn, Fe.Co.Ni.Cr, etc. can be used. Magnetic particles with a high coersive field, such as strontium and barium ferrites, alloys with a base of aluminum, nickel, cobalt, etc., can also be used.

Suitable resin binders are generally synthetic polymers which have good resistance to abrasion and which can easily react with the organic liquid solvent used to wet the magnetic layer. The resin binder will be selected as a function of the desired life of the transferred magnetic layer as well as the nature of the final support. Generally, suitable resin binders include polyvinyl butyrals, phenolic resins, copolymers of vinyl chloride with vinyl acetate, copolymers of vinylidene chloride with acrylonitrile, polyurethanes, epoxy resins, melamine-formaldehyde resins, or any other conventional binder for magnetic particles. These resins may be used singly or in combinations.

The thickness of the magnetic layer will be as thin as practical, generally in the range of from about 2 microns to about 25 microns. The magnetic layer will initially be deposited on a temporary support. Either the entire surface of the support may be coated or only individual strips or other configuration conforming to, or slightly greater in proportion than, the configuration to be transferred to the final or permanent substrate.

Generally, any support material capable of existing as a self-supporting film having at least one very smooth surface and which will be less adherent to the wetted magnetic layer than the material selected for the final or permanent substrate can be used as the temporary support material. Preferably, a smooth polyester support film, for example, a polyethylene terephthalate film will be selected as the temporary support. Other suitable temporary support films include, for example, polyethylene, cellulose acetate, and the like. The resin binders can be used alone or with additives.

The various additional additives include lubricants, hardeners, plasticizers, and the like which are well known in the art. The use of plasticizers in amounts of from about 5% to about 50% by weight, based upon the weight of the resin is especially preferred since the plasticizers make the magnetic layer more flexible and therefore avoid occurrence of breaks or cracks. Suitable plasticizers include, for example, tricresylphosphate, trioctyl phosphate, butylphthalate, dioctylphthalate, methyl cellosolve, ethyl glycolmonomethylether acetyl ricinoleate, methylcyclohexyladipate, fatty acids such as oleic acid, isostearic acid, stearate salts such as barium stearate, butyl stearate, etc., soya lecithin, and the like.

A substantial reduction in head and film wear can be achieved by incorporating a lubricating substance in the magnetic layer. For example, certain silicon materials, such as methyl and phenyl polysiloxanes, may be added to the magnetic layer. Other examples of lubricating substances are: silicon oils, fatty oils such as coco, tallow, marine, soya, cottonseed, castor, palm and oiticica oils, glyceryl stearate, glyceryl butylstearate, ethoxylated fatty acids such as ethoxylated lauric, stearic and tall oil acids, fatty alcohols having between 8 and 22 carbon atoms such as capric, lauric, palmitic, stearic and behenic alcohols, quaternary ammonium derivatives of fatty acids such as Armid, Aromeens and Duomeens and synthetic polymeric materials such as Teflon (polytetrafluoroethylene), polyethylene and halogenated fluorocarbon resin emulsions. The amount of the lubricant is not particularly critical but will generally be in the range of from about 2% to about 10% based upon the weight of the resin.

Various hardener substances can be added to the magnetic layer to improve the resistance to wear.

Suitable hardeners include, for example, isocyanate, polyamide peroxides well-known in the field of magnetic coatings. The amount of the hardener is not particularly critical but will generally be used in amounts of from about 1% to about 15% based upon the weight of the resin and more preferably from about 1% to 7% based upon the weight of the resin.

Generally, the amount of magnetic particles dispersed in the resin binder will be a function of the type of the magnetic particles and resin binder and the end use of the final product. In any case, the magnetic particles will be added to the resin at as high a loading rate as possible to provide the highest possible density of recorded information. Typically, the magnetic particles will constitute at least 50% by weight, and preferably at least 60% by weight, of the total weight of magnetic particles and binders (i.e. resin binder, plasticizers, lubricants, hardeners . . .)

The magnetic layer can be applied to the temporary support in any conventional manner. Generally, the magnetic layer will be deposited on the temporary support from a volatile organic solvent in such amount to provide a smooth layer of thickness of from about 2 microns to about 25 microns.

To prepare the magnetic layer for transfer from the temporary support to the permanent substrate, the magnetic layer is first wetted with an organic liquid which is a solvent for the resin binder of the magnetic layer. Actually, the solvating action of the liquid on the magnetic layer should not be so great as to actually dissolve the resin binder since this would have an adverse effect on the magnetic properties of the transferred magnetic layer. It is sufficient for the organic liquid to merely soften the resin binder to such an extent that it will readily separate from the temporary support. In a nonlimiting way, suitable organic liquid solvents include, for example, alcohols, ketones, esters, ethers, chlorinated solvents, and aromatic essences.

Any suitable well-known coating process can be used to wet the magnetic layer before transfer.

It will be obvious to one skilled in the art that he can select the nature, the sense of rotation and the speed of rotation of the wetting roll, the sense and the speed of transport of the coated temporary support, the position of the guide-roller in such a manner to provide a quantity of solvent from about 5 $cm^3/m^2$ to 50 $cm^3/m^2$.

In the case of paper substrates, the quantity of solvent will generally be selected from about 5 $cm^3/m^2$ to about 40 $cm^3/m^2$. If the quantity of solvent is less than 5 $cm^3/m^2$, the transfer of magnetic layer does not occur. If the quantity of solvent is higher than 40 $cm^3/m^2$, the structure of the transferred magnetic layer is damaged and there can be observed a great loss of the magnetic properties.

In the case of plastic substrates, particularly for polyvinylchloride substrates greatly used for different types of tickets, the quantity of solvent will generally be selected from about 10 $cm^3/m^2$ to about 50 $cm^3/m^2$. If the quantity of solvent is not choosen between these boundries, the same problems as for paper substrates is observed.

Suitable alcohols included aliphatic alcohols containing up to about 10 carbon atoms, preferably about 2 to about 4 carbon atoms. The alcohol may be a straight chain alcohol such as propanol, butanol, etc., branched alcohol such as isopropanol, or alicyclic such as cyclohexanol, etc.

Suitable ketones include aliphatic ketones having from about 2 to about 10 carbon atoms and include, for example, acetone, methylethyl ketone, methylisobutyl ketone, etc.

Suitable esters are generally the esters of saturated aliphatic carboxylic acids containing up to about 5 carbon atoms with saturated aliphatic alcohols containing up to about 5 carbon atoms. Suitable esters include, for example, methylacetate, butylacetate, isoproplyacetate, amylacetate, methylpropionate, ethylbutyrate, etc.

Suitable ethers include both open chain and closed chain ethers such as, for example, methyl ethyl ether, tetrahydrofuran, dioxane, etc.

Suitable examples of chlorinated solvents, include, for example, methylene chloride, ethylene dichloride, chloroform, carbon tetrachloride, trichlene, perchlene, etc.

Suitable examples of essences include, for example, oil of terpentine, etc.

Among these the preferred solvents include cyclohexanol, propanol, acetone, methyl ethyl ketone, methylacetate, butylacetate, isopropylacetate, tetrahydrofuran, methylene chloride and oil of terpentine.

To further promote the adherence of the magnetic layer to the permanent substrate, it is possible to incorporate suitable adhesives in the organic liquid solvent. Generally, the adhesives will be included in the solvent in amounts no greater than about 20% by weight based upon the total weight of solvent and adhesive. Generally, suitable adhesives will be selected from adhesives sensitive to the pressure and soluble in solvent, for example, polyurethane resins.

The manner of applying the organic liquid to the magnetic layer is not particularly critical. It has been found suitable, for example, to simply pass the magnetic layer, after being applied to the temporary support, over a roller immersed in the organic liquid solvent with the magnetic layer contacting the roller surface. It is also possible, for example, to simply spray the organic liquid solvent onto the magnetic layer.

The selection of the particular solvent will depend to a certain extent on the nature of the permanent substrate. In the case of a paper substrate, the solvent will generally be selected from alcohols, ketones, ethers, esters, and essences. For paper supports, and in general porous supports, the solvent should not have too high a solvent power for the resin binder since for too strong a solvent the magnetic properties of the transferred magnetic layer will deteriorate.

In the case of plastic substrates, the solvent will generally be selected from ketones, ethers, esters, chlorinated solvents, and essences. In this case, the solvent should be sufficiently aggressive to slightly attack, i.e., soften, the receiving surface, but not so strong for the resin binder of the magnetic layer as to completely solvate the latter.

In general, the final support, i.e., the permanent substrate, can be selected from paper, for example, cardboard, plastics, for example, polyvinyl chloride, polystyrene, polyester, paper and plastic laminates, for example, plastic-paper, plastic-plastic, plastic-metal, etc., metal sheets and generally any self-supporting material. The substrate will preferably have undergone a surface treatment or have been coated with an anchoring layer to facilitate the adhesion of the magnetic layer.

After the magnetic layer is sufficiently wetted with the organic liquid solvent and, optionally, the additional adhesive to soften the resin binder, the wet and softened magnetic layer, carried by the temporary support, is brought into intimate contact with the final support under a linear pressure measured, in the case of continuous transfer between two rolls, along the generatrices of the transfer rolls, of not less than 2 bars per centimeter of width, preferably at least 4 bars per centimeter of width. It is possible, of course, to bring the wet magnetic layer and final support into intimate contact with means other than transfer rolls, for example between a flat plate and single transfer roll. In any case, it only will require routine experimentation to determine the minimum pressure to be exerted at the line of contact between the magnetic layer and final support to cause the transfer of the magnetic layer from the temporary support to the final support. In general, the pressure will generally range from about 10 bars to about 50 bars per centimeter of width. In general, the less the hardness of the final support, the lower the pressure necessary to cause the magnetic layer to transfer.

An example of apparatus which has been found suitable for carrying out the process of the present invention is shown in the accompanying figure which will now be described.

Temporary magnetic film 13 formed from the transferable magnetic layer 16 on the temporary support 15 is unwound from roll 1 and fed to the cutting device A via the idler roll 2. The cutting device cuts the film into several strips of predetermined width. The magnetic layer 16 may be a continuous layer over the whole, or substantially whole, surface of support 15 or it may be in the form of individual, preferably parallel strips the side edges of which are parallel to the edges of the support 15.

In an alternative embodiment of the present invention, it is possible, for example, to feed the temporary magnetic film 13 to the cutting station A directly from the coating station where the transferable magnetic layer 16 is deposited on the temporary support film 15 without being wound to form the roll 1.

After leaving the cutting station, the individual strips of the cut film 13 are coated by the wetting unit B which includes a tank 17 filled with suitable solvent 4 and an engraved roll 3 which can be equipped with a scraper 18.

The engraved roll 3 can be driven in rotation by a motor (not shown) at a speed higher than the traveling speed of the strips and in the same or opposite direction to the direction of travel of the strips as shown by the arrows. It is also possible to have the engraved roll 3 freely rotatable about a central axis and to drive the roll by the strips.

After passing from the wetting unit B, the wetted strips are separated from one another by any suitable means (not shown in the drawing) and guided by the guide roll 7 between pressing rolls 8. In the meanwhile, the permanent substrate 14 is unwound from roll 5 and passed between pressing rolls 8 via guide roll 6. The wetted magnetic strips are then brought into contact with the final support 14 at the point C, the contact between the temporary and final support being maintained until roll 9 where separation begins and the transfer is completed. The final support and transferred magnetic coating is then wound on roll 12 and the temporary support film from which the magnetic layer has been removed is wound on roll 10 via guide roll 11. The pressure applied by rolls 8 at the point C to the temporary and final support is adjusted between 2 and 50 bars per centimeter of width.

As an alternative embodiment of the above described process, it is possible to exclude the cutting station A by starting with precut strips of suitably narrow temporary support upon which the magnetic coating layer is applied. It is also possible to transfer a plurality of spaced magnetic strips on a sufficiently wide sheet of the final support film and to cut the individual widths of the final support after the contact rolls 8 or after the roll 9. Of course, by starting with only a single magnetic strip applied to a temporary support and a final support having its width precut or preformed to the desired width of the final product the cutting operation will be omitted.

In practice, it has been found that the rate of transfer does not affect the quality of the transfer; transfer rates of 150 m/minute are attained without problem, whereas hot transfer processes are limited to transfer rates on the order of 30 m/minute.

The present invention will now be described from the following examples which are intended merely to exemplify without limiting the present invention.

EXAMPLE 1

A temporary polyethylene terephthalate support, 12 microns thick and 55 millimeters wide is coated with ten 5-millimeter wide strips of a magnetic coating layer. The magnetic coating layer contains 65% by weight of iron oxide ($\gamma$-21 D, a product of the SOFREM company), 25% polyvinyl butyral (B 10/20, a product of the Rhone-Poulenc company) and 10% tricresylphosphate (Pliabrac 521, a product of Allbright and Wilson Ltd). The coated temporary support is precut into 10 strips each strip being 5.5 mm wide and containing the 5 mm wide magnetic coating layer. The thickness of the deposited magnetic coating layer is about 6 microns.

The magnetic layer is wetted with isopropyl acetate, by a roll with fine helicoidal engravings (screw with a pitch of 0.33 mm with an angle of 90°, truncated or not). The wetting roll freely rotatable is located about 20 centimeters from the pressing rolls. In this example, a scraper was not used. The quantity of solvent provided is about 25 cm²/m².

The magnetic coating layers were transferred to a light cardboard, 270 mm thick (235 g/m²) sold under the trade name VELIN, at a rate of 100 meters per minute with a pressure of 12 bars per centimeter width. Ten reels each 30 mm wide were obtained.

The resulting tickets could be used several hundred times without mechanical deterioration of the magnetic strip.

The above example was repeated except that denatured alcohol or acetone were used as the wetting solvent. The following table shows the main electrical and magnetic characteristics of the magnetic layer before and after the transfer operation. Also shown in the table are the same electrical and magnetic characteristics of the same magnetic layer when transferred by a conventional hot transfer technique.

|  | Coercive field HC in oersteds | Flux $\phi r$ in Maxwell | Form factor Br/Bs |
|---|---|---|---|
| Before transfer | 300 | 0.42 | 0.84 |
| Hot transfer according to French Patent 1,250,721 at 200° and under a pressure of 200 bars/mc | 300 | 0.35 | 0.72 |
| Cold transfer |  |  |  |
| Isopyopyl acetate | 300 | 0.38 | 0.83 |
| Denatured alcohol | 300 | 0.36 | 0.76 |
| Acetone | 300 | 0.34 | 0.67 |

$\phi r$ being remanence, Bs being saturation magnetization as defined in a hysteresis cycle of magnetic material.

The above table clearly shows that the cold transfer process of this invention improves the qualities of the transferred magnetic strip onto the paper support when compared to the hot transfer method described in French Pat. No. 1,250,712 to the extent that a suitable solvent is selected. In this regard, for the particular magnetic layer and support materials, acetone in particular was too strong a solvent and the qualities of the transferred layer were inferior to those of the hot transferred layer. However, with isopropyl acetate and denatured alcohol as the wetting solvents, the properties of the transferred magnetic layer are greatly improved as compared to the hot transfer technique and closely correspond to the properties before transfer.

EXAMPLE 2

Example 1 was repeated except that the thickness of the magnetic layer was 9 microns. The transfer was performed under the same conditions and the following results were obtained.

|  | Coercive Field HC in oersteds | Flux $\phi r$ in Maxwell | Form factor Br/Bs |
|---|---|---|---|
| Before transfer | 300 | 0.68 | 0.86 |
| Cold transfer |  |  |  |
| Isopropyl acetate | 300 | 0.61 | 0.76 |
| Denatured alcohol | 300 | 0.54 | 0.76 |

EXAMPLE 3

Starting with the same temporary polyethylene terephthalate support as used in example 1, but of 100 millimeters width, they were coated with the same magnetic coating layer composition as used in example 1 of a thickness of 11 microns over the entire width of the support. The temporary support with the coated magnetic layer was precut into 16 equal sized tracks of 6.25 mm width each. After wetting the magnetic layers with isopropyl acetate using a roll with chemical engravings at 100 pits per centimeter with a steel foil scraper of 20 microns thickness, the wetting roll being driven by a motor at 100 meters per minute in the direction of the passage of the magnetic layer coated temporary support, (the quantity of solvent provided is about 20 cm³/m²) the wetted magnetic layer was passed between two contacting pressing rolls placed 20 centimeters from the wetting roll. The permanent support used was the same self-sticking light cardboard final support as used in example 1. The pressure between the contacting rolls was 4 bars per centimeter. The transfer of the magnetic layer was accomplished at a rate of 100 meters per minute. The tickets prepared from the resulting 16 reels had the same lifetime characteristics as the ticket obtained in example 1. The magnetic properties obtained with the ticket of this example are as follows:

|  | Coercive field HC in oersteds | Flux $\phi r$ in Maxwell | Form factor Br/Bs |
|---|---|---|---|
| Before transfer | 300 | 0.79 | 0.82 |
| Transfer with |  |  |  |

| | Coercive field HC in oersteds | Flux φr in Maxwell | Form factor Br/Bs |
|---|---|---|---|
| isopropyl acetate | 300 | 0.75 | 0.77 |

EXAMPLE 4

The following magnetic coating composition was deposited at a rate of 16.5 grams per square meter onto a two-inch wide strip of the same temporary polyethylene terephthalate support used in example 1:
70 weight% iron oxide γ-21 D of the SOFREM company
7 weight% carbon CORAX L of the DEGUSSA company
13.8 weight% of polyester-polyurethane Estane 5710 of the GOODRICH company
7.8 weight% of epoxy resin Epikote 1007 of the SHELL company
1.4 weight% soya lecithin ALCOLEC S of the AMERICAN LECYTHINE company Twenty-seven strips of the above composition, each 1.5 millimeters wide, were formed. After passing through the cutting station to form 27 separate magnetic strips, each strip was wetted with methyl ethyl ketone or acetone with a roller having flexo-mechanical engravings at 50 pits per centimeter. The wetting roller was scraped and driven in the direction of the passage of the strips at a rate of 80 meters per minute. The quantity of solvent provided is about 30 cm³/m².

The wetted magnetic strips were transferred to a polyvinyl chloride support 0.4 mm thick by passing the final support and temporary support through the nip of two contacting rollers placed 30 centimeters from the coating roller. The pressing at the nip of the contacting rolls was 12 bars per centimeter of width. The transfer was performed at a rate of 120 meters per minute.

The resulting cards produced from the reels of the magnetic strips transferred to the polyvinylchloride support were capable of being used several hundreds of times without mechanical deterioration and without loss of the mechanical or electrical characteristics of the magnetic layer. The following magnetic and electric characteristics were obtained:

| | Coercive field HC in oersteds | Flux φr (Maxwell) | Form factor Br/BS |
|---|---|---|---|
| Before transfer | 300 | 0.53 | 0.83 |
| Transfer with acetone | 300 | 0.51 | 0.83 |
| Transfer with methyl ethyl ketone | 300 | 0.52 | 0.83 |

In this example, it is possible to replace the mixture of polyesther-polyurethane resin and epoxy resin binder with equal proportions of the polyesther-polyurethane resin alone, plasticized vinyl acetochloride, plasticized polyvinyl formal, etc.

The excellent retention of the magnetic and electrical characteristics of the transferred magnetic layer in this example are believed to be due, at least in part, to the relative insolubility of the binder resins in the acetone and methyl ethyl ketone solvents and to the slight solvent effect of these solvents on the polyvinyl chloride support which improves the adherence of the transferred magnetic layer.

EXAMPLE 5

The following magnetic coating composition is prepared (proportions by weight):
72% iron oxide MAG 1730 of the BAYER company
22% of vinly chloride-vinyl acetate copolymer VAGH of the Union Carbide company
6% oleic acid of the OLIFINA company A single layer of the above prepared composition was deposited at a thickness of 15 microns on the same temporary polyethylene terephthalate support used in example 1. The magnetic layer was transferred onto a final support of a polyvinyl chloride/paper complex 320 microns thick. Methyl ethyl ketone was used as the solvent with a scraped roller with helicoidal engravings placed 20 centimeters from the contacting pressure rollers. The coating roller was driven by passage of the magnetic layer at a rate of 100 meters per minute. The quantity of solvent provided is about 35 cm³/m². The pressure between the final support and temporary support between the contacting pressure rollers was 12 bars per centimeter. The resulting tickets could be used several hundred times without any deterioration. The magnetic and electrical characteristics of the magnetic layer before and after transfer are as indicated in the following table:

| | Coercive field HC in oersteds | Flux φr (Maxwell) | Form factor Br/Bs |
|---|---|---|---|
| Before transfer | 310 | 1.13 | 0.80 |
| Transfer with methyl ethyl ketone | 310 | 1.05 | 0.76 |

EXAMPLE 6

Starting with the magnetic layer-coated temporary support of example 4, the magnetic layer was transferred onto a polyester support coated with an anchoring layer having an acrylic base. In this example, the wetting solvent was either 10% solution by weight of polyester-polyurethane (Estane 5703 adhesive) in tetrahydrofuran (THF) or in acetone. The coating roller had pyramid engravings and was placed 12 centimeters from the contacting pressure rolls. A steel foil was used to scrape the coating roller, the latter being driven by a motor at 100 meters per minute in a direction opposite to the path of travel of the coated temporary support. The quantity of solvent provided is about 15 cm³/m². Transfer was performed at a rate of 100 meters per minute at a contacting pressure of 15 bars per centimeter. The resulting tickets produced in this manner were capable of several hundred uses without deterioration. The magnetic and electrical characteristics of the resulting tickets are shown in the following table:

| | Coercive field HC in oersteds | Flux φr (Maxwell) | Form factor Br/Bs |
|---|---|---|---|
| Before transfer | 300 | 0.53 | 0.83 |
| Transfer with THF (90%) + Estane 5703 resin (10%) | 300 | 0.40 | 0.79 |

-continued

| | Coercive field HC in oersteds | Flux φr (Maxwell) | Form factor Br/Bs |
|---|---|---|---|
| Transfer with acetone (90%) Estane 5703 (10%) | 300 | 0.39 | 0.80 |

What is claimed is:

1. A cold transfer process for transferring a magnetic layer from a temporary support to a permanent support film which comprises applying a magnetic layer comprising finely divided magnetic particles uniformly dispersed throughout a resin binder onto a temporary support film; wetting the magnetic layer with an organic liquid solvent which is capable of softening the resin binder but will not dissolve the resin binder such that the layer will readily separate from the temporary support; bringing the wet and softened magnetic layer into pressure contact with said final support to thereby transfer the magnetic layer from said temporary support to said final support.

2. The method of claim 1 wherein the final support is paper or other porous material and the organic liquid solvent is selected from the group consisting of alcohols, ketones, ethers, esters and essences.

3. The method of claim 2 wherein the resin binder is selected from the group consisting of polyvinyl butyrals and copolymers of vinyl chloride with vinyl acetate.

4. The method according to claim 1 wherein the final support is a plastic film and the organic liquid solvent is selected from the group consisting of ketones, ethers, esters, chlorinated solvents and essences.

5. The method according to claim 4 wherein the resin binder is selected from the group consisting of copolymers of vinyl chloride and vinyl acetate, polyvinyl formals and polyester-polyurethane resins, or mixtures of at least 40% by weight of polyester-polyurethane resins with at least one member selected from the group consisting of epoxy resins, vinyl acetochlorides, polyvinyl formals and copolymers of vinylidene chloride with acrylonitrile.

6. The method according to claim 1 in which the organic liquid used to wet the magnetic layer additionally includes up to 20% by weight of an adhesive.

7. The method according to claim 1 in which the transfer pressure between the wetted magnetic layer on the temporary support and the final support is at least 2 bars per centimeter of width.

8. The process according to claim 7 wherein the transfer pressure is in the range of from about 10 bars to about 50 bars per centimeter of width.

9. The process according to claim 1 wherein the quantity of organic liquid solvent used to wet the magnetic layer is in the range of from about 5 $cm^3/m^2$ to 50 $cm^3/m^2$.

10. The process according to claim 4 wherein the quantity of organic liquid solvent is from about 10 $cm^3/m^2$ to about 50 $cm^3/m^2$.

11. The process of claim 2 wherein the amount of the organic liquid solvent used to wet the magnetic layer is from about 5 $cm^3/m^2$ to about 40 $cm^3/m^2$.

12. The process of claim 1 wherein the wet magnetic layer is transferred from the temporary support to the final support at a rate of about 100 meters per minute to about 150 meters per minute.

* * * * *